United States Patent [19]

Kaiser-Wirz

[11] 4,323,314
[45] Apr. 6, 1982

[54] PROCESS AND APPARATUS FOR ADDING LIQUID COMPONENTS TO POURABLE POWDERED OR GRANULAR MATERIALS

[76] Inventor: Max Kaiser-Wirz, Wintersingerstrasse 23, CH-4465 Magden, Switzerland

[21] Appl. No.: 91,163

[22] Filed: Nov. 5, 1979

[51] Int. Cl.³ ............................................... B01F 5/20
[52] U.S. Cl. ................... 366/167; 366/174; 366/177
[58] Field of Search ............... 366/167, 173, 174, 177, 366/9, 33, 34, 36, 6, 10, 13, 40, 65, 64, 169, 171, 172; 118/303

[56] References Cited

U.S. PATENT DOCUMENTS

| | | | |
|---|---|---|---|
| 1,072,143 | 9/1913 | Simpson | 366/9 |
| 1,218,250 | 3/1917 | Fox | 366/174 |
| 1,855,548 | 4/1932 | Forster | 366/169 |
| 2,746,728 | 5/1956 | Pomerleau | 366/173 |
| 2,953,359 | 9/1960 | Mau | 366/172 |
| 4,112,517 | 9/1978 | Giombini | 366/168 |
| 4,190,369 | 2/1980 | Rikker | 366/34 |

*Primary Examiner*—Robert W. Jenkins
*Attorney, Agent, or Firm*—Henderson & Sturm

[57] ABSTRACT

A vessel is described for the continuous mixing of pourable powdered or granular materials with liquid components, the pourable material being supplied to the vessel at the top. A deflector deflects the still dry material so that it trickles down inside the vessel in a hollow cylindrical stream. As it falls down freely it is subjected to spray from one or more nozzles of the liquid which is to be mixed with it. One nozzle is provided beneath the deflector and can spray the downwardly trickling stream from the inside. In the wall of the vessel several circles of nozzles are provided at various levels their spraying direction being directed radially inwards onto the downwardly trickling material

2 Claims, 2 Drawing Figures

PROCESS AND APPARATUS FOR ADDING LIQUID COMPONENTS TO POURABLE POWDERED OR GRANULAR MATERIALS

BACKGROUND OF THE INVENTION

The invention relates to a process and apparatus for adding one or more liquid components to pourable powdered or granular materials.

In practice, serious mixing problems arise when, for example, it is desired to add molasses to granular animal feedstuffs, or when wood chips or sawdust are to be mixed with adhesive. This kind of mixing problem also arises frequently in chemical processing.

Until now a drum mixer in which the components which are to be mixed are mixed together either continuously or in batches has been used for this purpose. Problems arise since the walls of themixture become clogged readily, upsetting the operation, and requiring frequent cleaning.

The invention is based on the task of providing a process and apparatus for carrying it out, which avoids the said disadvantages, is economical and ensures satisfactory mixing.

SUMMARY OF THE INVENTION

According to the present invention, a process of adding one or more liquid components to a pourable powdered material consists in supplying the pourable material over a deflector, after which it trickles downwards in the form of a hollow cylindrical stream, falling freely, and is sprayed with the liquid components by means of at least one nozzle as it falls.

The invention also lies in apparatus specifically adapted to perform this process.

If very small throughput quantities are involved, one spraying nozzle arranged centrally in the downwardly trickling stream and spraying the liquid component from the inside into the follow cylindrical stream is sufficient. For larger throughput quantities, the downwardly trickling stream is additionally or exclusively sprayed by several spraying nozzles from the outside inwards, with the liquid components which are to be added.

The invention will now be described by way of example with reference to the accompanying drawing.

DESCRIPTION OF THE PREFERRED EMBODIMENT

Figure 1:
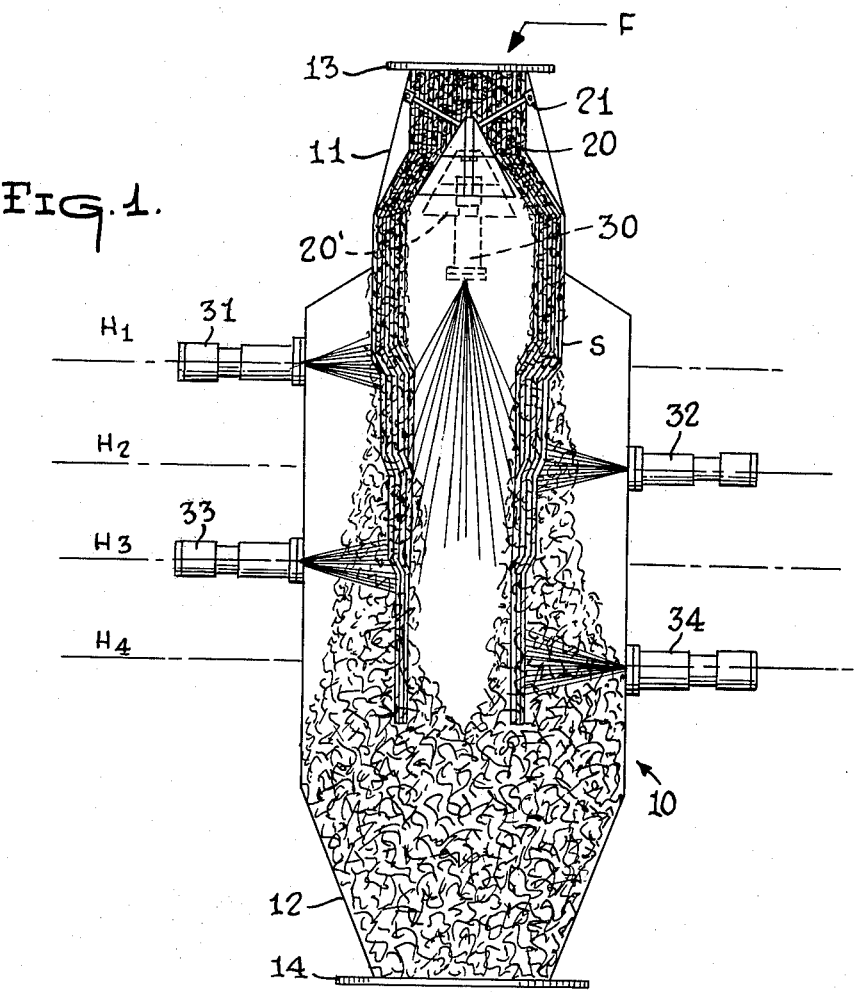
FIG. 1 is a vertical section through a falling stream/liquid mixing appliance.
Figure 2:
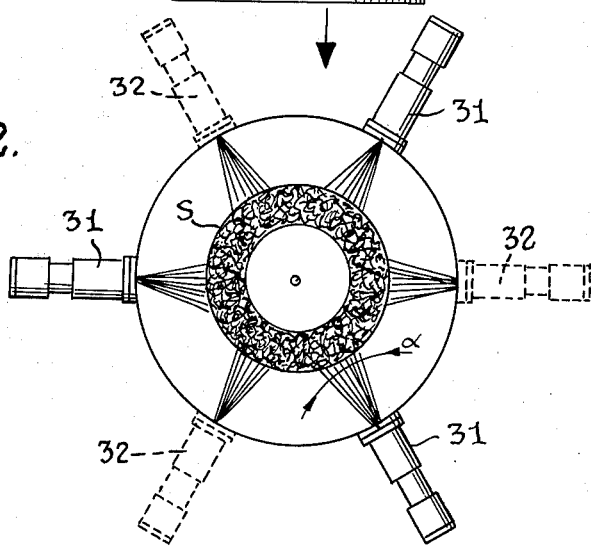
FIG. 2 is a horizontal section through the mixer.

The mixing vessel is generally designated 10. It is substantially in the shape of a hollow cylinder with an upper supply part 11 which widens out towards the bottom, and a lower part 12 which tapers down to the outlet port. Flanges 13, 14 are provided at the top and at the bottom. A feed device F, which is not shown and which supplies the dry pourable material continuously, is connected to the upper flange 13.

A discharge pipe for the mixed substance can be connected to the lower flange 14.

Inside the upper part 11 there is a cap-shaped or conical deflector which is held by the stays 21. Tle height of the deflector is adjustable. A second setting for the deflector is shown with the dashed line 20'. A spraying nozzle 30 is also indicated in dashes, arranged centrally beneath the deflector, its spraying direction being directed axially towards the interior of the vessel 10.

A single spraying nozzle arranged like this is suitable only for very small throughput quantities. However, so that large throughout quantities can also be handled, several nozzles are provided on the wall of the vessel in circular formation and at various heights $H_1$–$H_4$. At the level $H_1$ there are three nozzles 31, each offset by 120° on the circumference of the vessel. The spraying angle is smaller than the angle between the tangents from the relevant nozzle to the hollow cylindrical stream S of downwardly trickling chip material, so that the liquid which is to be added does not reach the opposite internal wall of the vessel, which could upset the operation of the mixing equipment. However, so that the downwardly trickling stream of pourable material is nonetheless wetted all over, the three spraying nozzles 32 are offset circumferentially by 60° from the nozzles 31, at the level $H_2$. The nozzles 33 at the level $H_3$ lie perpendicularly beneath the nozzles 31 and the nozzles 35 at the level $H_4$ lie perpendicularly beneath the nozzles 32.

The height adjustment of the deflector 20 allows the throughput quantity of the pourable material to be adjusted and adapted to the process. If the deflector is displaced upwardly, the annular gap between the part 11 and the deflector 20 becomes narrower and less pourable material per unit of time trickles into the mixing vessel.

For operating the falling-stream machine, a setting of throughput quantity per unit of time is chosen which allows a continuous flow. Accordingly, the supply of the fluid which is to be added is also adjusted. With small throughput quantities it may possibly suffice to use only the centrally arranged nozzle 30. With larger quantities, the nozzles 31 and 32 will be used additionally or exclusively, and depending on the circumstances, the nozzles 33 and 34 may be used as well.

Since the falling-stream mixing machine has no moving parts and requires no motor force to drive it, such as is required for a drum mixer, it is economical to operate. As already explained, the mixer is suitable for continuous operation.

Having thereby disclosed the subject matter of this invention it should be obvious that many modifications, substitutions, and variations of the invention are possible in light of the above teachings. It is therefore to be understood, that the invention may be practiced other than as specifically described, and should be limited only by the breadth and scope of the appended claims.

What I claim is:

1. A process for continuously adding at least one liquid component to pourable material in a cylindrical vessel having a conical deffector disposed between the pourable material supply and an outlet in the bottom of the vessel, consisting of the steps of;
   a. feeding the pourable material into the vessel in such a manner that the material trickles downwardly in the vessel, falling freely in the shape of a hollow cylindrical stream,
   b. spraying the interior of the cylindrical stream with a liquid component from at least one nozzle centrally disposed within the deflector,
   c. spraying the exterior of the cylindrical stream with a liquid component from at least one nozzle disposed in the wall of the vessel, wherein the only movement which takes place within the vessel is produced by the pourable material, and said at least one liquid component.

2. An apparatus for continuously adding at least one liquid component to pourable material consisting of;
- a substantially cylindrical vessel having an upper diverging supply part, and a lower part which converges at an outlet port;
- a conical deflector, disposed in the upper supply part, which can be adjusted to vary the throughput of the pourable material through the vessel for a given process, wherein the pourable material, passing through the vessel trickles downwardly, falling freely in the shape of a hollow cylindrical stream;
- at least one nozzle centrally disposed within said conical deflector, and adapted to spray the interior of the hollow cylindrical stream of pourable material with a liquid component; and
- at least one nozzle disposed in the wall of the vessel, and adapted to spray the exterior of the hollow cylindrical stream of pourable material with a liquid component, wherein the only movement which takes place within the vessel is produced by the pourable material and at least one liquid component.

* * * * *